though Patent Office
3,778,345
Patented Dec. 11, 1973

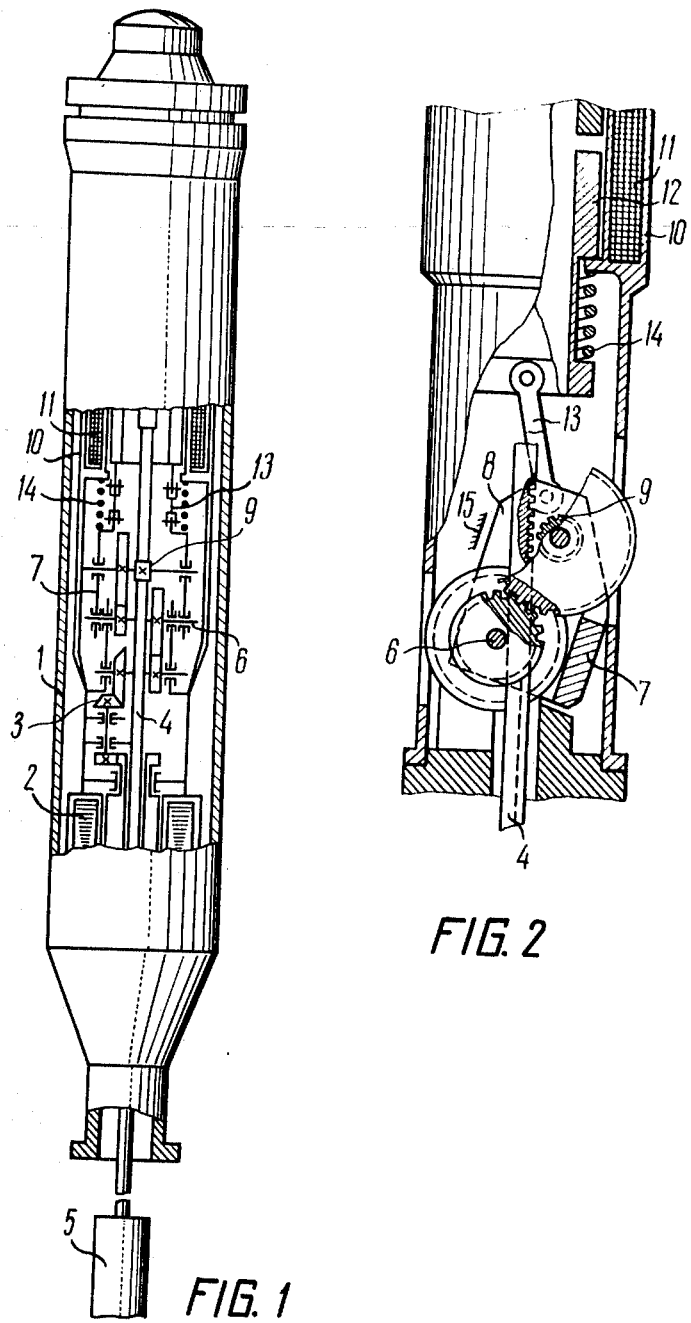

3,778,345
DEVICE FOR ENGAGING AND DISENGAGING PINION AND RACK IN DRIVE OF NUCLEAR REACTOR REGULATING ELEMENT
Boris Arkadievich Maslenok, Kolpino, ulitsa V. Slutskoi 34, kv. 40; Viktor Grigorievich Zlobin, Kolpino, ulitsa V. Slutskoi 38, kv. 223; Anatoly Sergeevich Khegai, Kolpino, ulitsa Vokzalnaya 11, kv. 10; Vladimir Petrovich Nikolaev, Kolpino, ulitsa Proletarskaya 58, kv. 91; and Evgeny Adolfovich Krjuger, Zanevsky prospekt 51, kv. 12, all of Leningrad, U.S.S.R.
Filed Mar. 31, 1972 Ser. No. 240,078
Int. Cl. G21c 7/12
U.S. Cl. 176—36 R      1 Claim

ABSTRACT OF THE DISCLOSURE

The invention relates to a device for engaging and disengaging the pinion and rack in the drive of a nuclear reactor regulating element.

The device according to the invention is characterized in that the electromagnet which engages the pinion with, and disengages it from, the rack is installed coaxially with the rack axis whereas the swinging balance arm carrying the pinion is connected with the electromagnet core by articulated rods set at an acute angle to the rack axis.

This simplifies the drive of the regulating element, reduces the lateral dimensions of the drive and cuts down the time elapsing from the moment of receiving the signal for the movement of the regulating element in the reactor zone to the beginning of its movement both under the regulating and emergency protection conditions.

---

The present invention relates to the field of nuclear engineering and more particularly it relates to a device for engaging and disengaging the pinion and rack in the drive of a nuclear reactor regulating element, said device combining the functions of regulation and emergency protection.

Known in the art is a device for engaging and disengaging the pinion and rack in the drive of a nuclear reactor regulating element comprising: a pinion rotated by an electric motor via a speed reducer; a balance arm rotating around a drive gear shaft and carrying a pinion engaging a rack; a spring and a hydraulic jack used, respectively, for disengaging and engaging the pinion and rack; an electromagnet holding the balance arm in the position corresponding to engagement of the pinion with the rack (see, for example, Pat. No. 1337402, France).

A disadvantage of the known device resides in that it has interrelated electrical and hydraulic elements which complicates the design and control system of the device, impairs the operational reliability and increases the time elapsing from the moment of receiving the signal for the movement of the regulating element in the reactor zone to the beginning of its movement both under the regulating and emergency protection conditions.

Another disadvantage of the known device lies in that the electromagnet and other elements of the device are arranged sideways of the rack which increases the lateral dimensions of the drive thus hampering its convenient and compact installation on the reactor and its servicing in operation.

An object of the present invention is to simplify the design of the device, reduce the lateral dimensions of the drive and the time elapsing from the moment of receiving the signal for the movement of the regulating element in the reactor zone to the beginning of its movement both under the regulating and emergency protection conditions.

These objects are accomplished by providing a device for engaging and disengaging the pinion and rack in the drive of a nuclear reactor regulating element wherein the electromagnet controlling the engagement and disengagement of the pinion and rack is arranged coaxially with the rack axis and the swinging balance arm is connected with the electromagnet core by articulated rods set at an acute angle to the rack axis.

The use of the present invention allows, if necessary, increasing the number of drives installed on the reactor, simplifies servicing, improves reliability of the reactor control system and cuts down capital expenses per unit of thermal capacity of a reactor plant.

Now the invention will be described in detail by way of example with reference to the accompanying drawings, in which:

FIG. 1 is a general view of the drive of a nuclear reactor regulating element;

FIG. 2 shows the device for engaging and disengaging the pinion and rack in the drive according to FIG. 1, partly cut away.

The device according to the invention is accommodated in a drive body 1 (FIG. 1). An electric motor 2 located in the lower part of the body 1 drives a speed reducer 3. The electric motor 2 has a hollow rotor (not shown in the drawings) through which a rack 4 passes. A regulating element 5 is suspended from the lower end of the rack 4. Installed rotatably on the shaft 6 (FIGS. 1, 2) of the speed reducer 3 is a swinging balance arm 7 whose side plates 8 secure a pinion 9.

The pinion 9 is rotated by the speed reducer 3 and reciprocates the rack 4.

An electromagnet 10 with a winding 11 and a core 12 is installed above the speed reducer 3, coaxially with the axis of the rack 4; said core 12 is connected with the side plates 8 by articulated rods 13 set at an acute angle to the axis of the rack 4.

The movement of the core 12 turns the swinging balance arm 7 on the shaft 6, either engaging the pinion 9 with, or disengaging it from, the rack 4.

When the winding 11 is deenergized, the core 12 is forced to the lower position by a spring 14. Normal engagement of the pinion 9 with the rack 4 is ensured by a stop 15 installed in the body 1.

The device according to the invention functions as follows.

On energizing the electromagnet 10, the core 12 moves upward and, compressing the spring 14, turns the swinging balance arm 7 on the shaft 6, thus meshing the pinion 9 with the rack 4. Rotation of the electric motor 2 is transmitted by the speed reducer 3 to the pinion 9 which moves the rack 4 up or down at a preset speed under the regulating conditions.

On receiving an emergency protection signal, the power supply of the winding 11 is cut off and the core 12 is moved down by the spring 14 and the weight of the falling parts; acting upon the articulated rods 13, the core 12 turns the swinging balance arm 7, thus demeshing the pinion 9 from the rack 4.

The disengaged rack 4 and the regulating element 5 go down into the nuclear core under their own weight, ensuring emergency protection.

What is claimed is:

1. A device for engaging and disengaging the pinion and rack in the drive of a nuclear reactor regulating element comprising an electromagnet for engaging and disengaging the rack and pinion, said electromagnet being arranged coaxially with the axis of said rack; an electric motor moving said rack via a speed reducer provided with a swinging balance arm which carries said pinion, one end of said balance arm being installed on the shaft of said speed reducer and connected with the core of said electromagnet by articulated rods which are set at an acute angle to the axis of said rack.

References Cited

UNITED STATES PATENTS

| | | | |
|---|---|---|---|
| 3,139,384 | 6/1964 | Filloleau et al. | 176—36 R |
| 3,518,162 | 6/1970 | Lichtenberger | 176—36 R |

HARVEY E. BEHREND, Primary Examiner

U.S. Cl. X.R.

74—31